United States Patent [19]

Stouffer et al.

[11] 4,210,283
[45] Jul. 1, 1980

[54] DUAL PATTERN WINDSHIELD WASHER NOZZLE

[76] Inventors: Ronald D. Stouffer, Silver Spring, Md.; Bowles Fluidics Corporation, 02, Silver Spring, Md.

[21] Appl. No.: 941,158

[22] Filed: Sep. 11, 1978

[51] Int. Cl.² .............................................. B05B 1/08
[52] U.S. Cl. ................................. 239/11; 239/284 R; 239/590
[58] Field of Search ................. 239/11, 101, 102, 540, 239/284 R, 284 A, 589, 590, 590.5, DIG. 3; 15/250.01, 250.02; 137/808–811, 823, 826, 835

[56] References Cited

U.S. PATENT DOCUMENTS

| | | | |
|---|---|---|---|
| 3,331,382 | 7/1967 | Horton | 137/811 X |
| 3,423,026 | 1/1969 | Carpenter | 239/102 X |
| 3,608,573 | 9/1971 | Bahrton | 137/811 X |
| 3,783,904 | 1/1974 | Amagami et al. | 137/811 |
| 4,052,002 | 10/1977 | Stouffer | 239/DIG. 3 X |
| 4,151,955 | 5/1979 | Stouffer | 239/11 |
| 4,157,161 | 6/1979 | Bauer | 239/284 R X |

*Primary Examiner*—Johnny D. Cherry
*Attorney, Agent, or Firm*—Howard L. Rose

[57] ABSTRACT

A dual pattern nozzle comprises a fluid oscillator of the type which utilizes an obstacle or island in the path of liquid flow to produce a vortex street downstream of the island. A flow splitter is disposed downstream of and sufficiently close to the island to prevent the flow around the island from re-combining before reaching the flow divider, whereupon liquid vortices are alternately issued from each side of the divider. The spinning liquid breaks up into two patterns of droplets, the patterns being directed at respective spaced areas.

15 Claims, 4 Drawing Figures

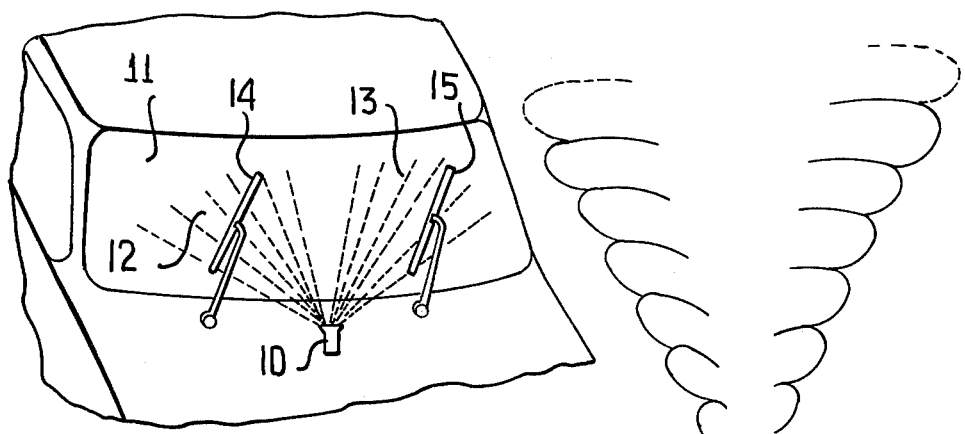
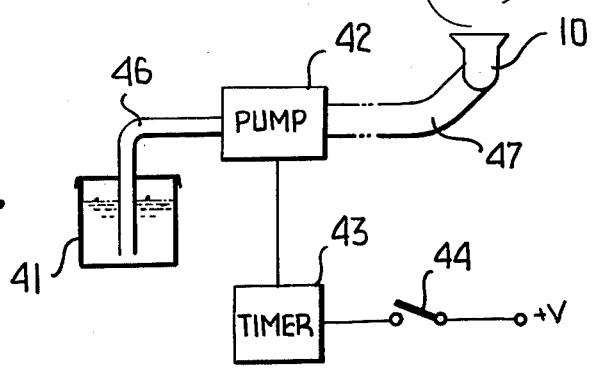
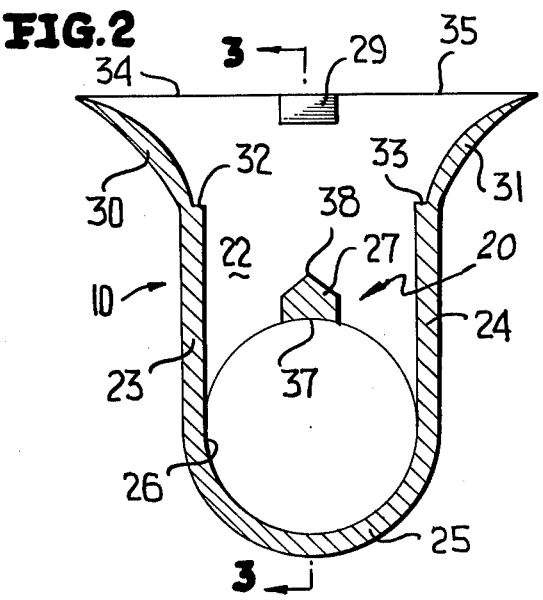
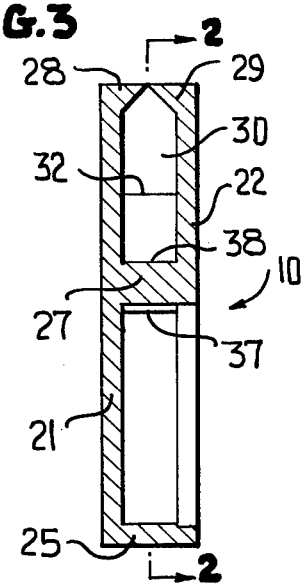

and passenger sides of a windshield and no drops are deposited at the middle of the windshield. Further, if the temperature drops so low as to prevent or substantially limit oscillation, two non-oscillating, or slightly oscillating jets are issued at the driver and passenger sides, respectively, of the windshield rather than between those areas where it is not required.

DUAL PATTERN WINDSHIELD WASHER NOZZLE

DESCRIPTION

1. Technical Field

The present invention relates to dual pattern spray nozzles and, more particularly, to spray nozzles employed as windshield washers.

Windshield washer nozzles of the straight jet type require plural nozzles to cover the area to be cleaned on a vehicle windshield. In addition, these nozzles create an initial film or puddle of liquid which impedes visibility until wiped by the windshield wipers. These problems are solved by using a swept jet fluidic oscillator in which the swept jet forms a fan pattern and breaks up into small droplets which wet the required area without forming a film or puddle. However, such fluidic oscillator nozzles have the disadvantage of issuing a significant amount of liquid in the middle of the windshield where it is not needed. In addition, at lower temperatures the sweep angle of the jet tends to be rather small, resulting in a narrowly swept or non-swept jet being issued onto the middle of the windshield rather than towards the driver's and passenger's sides.

2. Background Art

A fluidic windshield washer nozzle of the type described above is disclosed in U.S. patent application Ser. No. 618,252, filed Sept. 30, 1975, by Peter Bauer and entitled "Improved Windshield Washer" now U.S. Pat. No. 4,157,161 issued June 5, 1979. In one embodiment disclosed therein the swept jet oscillator, when in a proper oscillation mode, issues some liquid at the center of the windshield where it is not needed. In addition, when low temperatures limit the sweep angle of the oscillator, all of the liquid is issued at the center of the windshield. A second embodiment in the aforesaid patent application comprises an oscillator which alternately issues liquid pulses toward the driver and passenger sides. This latter embodiment suffers from the disadvantage of creating an initial puddle or film which impedes visibility until wiped clear by the windshield wipers.

DISCLOSURE OF THE INVENTION

In accordance with the present invention, a windshield washer nozzle includes a modified form of the fluidic oscillator described in my co-pending U.S. patent application Ser. No. 845,117, filed Oct. 25, 1977 now U.S. Pat. No. 4,151,955 issued May 1, 1979. In that oscillator an obstacle or island is placed in the path of a defined liquid stream to create a vortex street downstream of the island; the vortex street causes the resulting issued liquid jet to sweep back and forth, whereupon it breaks up into small droplets. I have discovered that if a flow splitter is placed at a location within the cavitation region formed downstream of the island, the vortices issue alternately from either side of the divider. Each liquid vortex breaks up into ligaments and then droplets which are distributed over respective sides of a windshield. The sidewalls of the oscillator are made to diverge at angles consistent with establishing Coanda effect, thereby permitting the nozzle to be designed with desired angles sub-tended by the two issued fan-shaped patterns.

The improved windshield washer nozzle has the advantage that two fan-shaped patterns are issued from a single oscillator to deposit droplets on both the driver and passenger sides of a windshield and no drops are deposited at the middle of the windshield. Further, if the temperature drops so low as to prevent or substantially limit oscillation, two non-oscillating, or slightly oscillating jets are issued at the driver and passenger sides, respectively, of the windshield rather than between those areas where it is not required.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein:

FIG. 1 is a view in perspective of a motor vehicle windshield and spray apparatus according to the present invention;

FIG. 2 is a view in longitudinal section of a fluidic spray apparatus employed in FIG. 1 and taken along lines 2—2 of FIG. 3;

FIG. 3 is a view in transverse section of the fluidic spray apparatus taken along lines 3—3 of FIG. 2; and FIG. 4 is a diagrammatic illustration of the fluidic spray apparatus illustrating the spray pattern issued therefrom.

BEST MODE FOR CARRYING OUT THE INVENTION

Referring to the drawings, a fluidic spray device 10 constructed in accordance with the present invention is secured to a motor vehicle forward of the vehicle windshield 11. Fluidic spray device 10 is disposed generally along the longitudinal centerline of the vehicle so that the device is substantially centered with respect to the windshield. Wash liquid under pressure is supplied to spray device 10 in any conventional manner such as that described in the aforementioned U.S. Pat. No. 4,157,161.

Spray device 10, in a manner described below, issues the pressurized wash liquid in two distinct spray patterns 12 and 13. Spray patern 12 is a fan-shaped distribution of droplets directed toward the passenger side of the windshield; spray pattern 13 is a fan-shaped distribution of droplets directed toward the driver side of the windshield. The droplets in spray pattern 12 are readily wiped clear by windshield wiper 14; wiper 15 serves the same function for the droplets from pattern 13. Importantly, no liquid is sprayed onto the mid-portion of windshield 11 between the driver and passenger sides. Also important is the fact that the two sweeping spray patterns emanate from a single fluidic oscillator, described below.

Referring to FIGS. 2 and 3, spray device 10 comprises a fluidic oscillator of the general type described in my aforementioned U.S. Pat. No. 4,151,955. Specifically, an integral molded plastic body comprises a chamber having a top wall 21, a bottom wall 22, a left sidewall 23, a right sidewall 24 and an upstream end wall 25. Upstream end wall 25 is of semi-circular configuration for the specific embodiment illustrated in order to facilitate fabrication; it is to be understood, however, that this is not a limiting feature of the invention. The depth dimension of the chamber is the smallest of its three dimensions and is defined between parallel top wall 21 and bottom wall 22. The width dimension of the chamber is defined between sidewalls 23 and 24 and is considerably greater than the depth dimension. Sidewalls 23 and 24 are substantially parallel throughout most of the chamber but include divergently curved portions 30, 31, respectively, at the chamber downstream end. The length dimension of device 10, between upstream wall 25 and the open downstream end, is the largest of the three dimensions. It should be noted, however, that the length and width dimensions may be more nearly equal, or the width may be made larger than the length, for specified application.

A circular inlet opening 26 is defined through bottom wall 22 and is adapted to receive a suitable fitting or hose connection by which pressurized wash liquid may be supplied to the chamber 20. Half of opening 26 is co-extensive with semi-circular end wall 25 in this particular embodiment. An obstruction or island 27 extends between top wall 21 and bottom wall 22 at a location substantially centered between sidewalls 23 and 24. In the particular embodiment illustrated, the upstream side 37 of island 27 is a small arcuate wall which is co-extensive with an arc of circular opening 26; this too is a matter of fabrication convenience and is not a limiting feature of the invention. The sides of island 27 extend parallel in a downstream direction and then converge to an apex 38 located centrally between sidewalls 23, 24.

A flow splitter, disposed at the downstream end of chamber 20, defines left and right outlet openings 34, 35 and comprises two members 28, 29 extending from top wall 21 and bottom wall 22, respectively. More specifically, members 28 and 29 have the same width, which width is slightly smaller or generally of the same order of magnitude as the width of island 27. Member 28 tapers in the depth dimension to a straight edge which abuts a similar straight edge on similarly tapered member 29. Alternatively, the flow splitter may comprise a single member instead of two members 28, 29; however, the two-member approach facilitates removal of the mold tooling members during fabrication of spray device 10 as a single integral plastic unit.

The transition between the parallel portions of sidewalls 23, 24 and the diverging portions 30, 31 is demarked by stepped or cut back sections 32, 33, respectively. The purpose of those steps and the curved sidewall sections is to take advantage of the Coanda effect in forming the issued spray patterns, as described below.

Pressurized liquid entering inlet opening 26 naturally flows towards the open outlet end of device 10. As described in my aforementioned U.S. Pat. No. 4,151,955, island 27 causes alternating vortices to be shed therefrom downstream of the island, which vortices form the well known Karman vortex street pattern. These vortices subsist at the sides of the chamber 20. The region in the middle of the chamber, downstream of island 27, experiences cavitation. Flow splitter 28, 29 is located sufficiently close to the island 27 as to be within this cavitation region.

If the flow splitter 28, 29 were absent, the liquid would issue from the outlet end of chamber 20 as a single jet which is cyclically swept under the influence of the vortex street. I have found, however, that the flow splitter causes two alternating series of vortices to issue, one from outlet opening 34, the other from outlet opening 35. The vortices expand to fill the angular area between positions defined by a curving sidewall and the flow splitter. For example, each liquid issued from outlet opening 34 expands between one extreme position, wherein it is guided by the Coanda effect along sidewall 32, and a second extreme position defined by flow splitter 28, 29.

FIG. 4 illustrates schematically a washer nozzle 10, its actuating mechanism, and the dual pattern spray issued from the washer nozzle. It should be noted that the actuator of FIG. 4 is entirely conventional and is merely intended to serve as one example of numerous types of actuators which serve the same function. A reservoir 41 of wash liquid is arranged to have liquid pumped therefrom by means of a pump 42 acting via flow tube 46. The pumped liquid is supplied via tube 47 to sprayer nozzle 10. Pump 42 is actuated by an operator-controlled switch 44 which initiates a time cycle at timer 43. For the predetermined time cycle of the timer, which typically may be one to five seconds, pump 42 is rendered operative to draw wash liquid from reservoir 41 and deliver it to nozzle 10.

The two patterns issued from nozzle 10 are 180° out of phase; that is, the vortices issue alternately from each side of the flow divider. In addition, the vortices are oppositely directed in that vortices on one side of the flow divider spin clockwise while those issued from the other side spin counterclockwise. Each vortex tends to expand transversely of the net flow direction, the expansion being limited by the initial constraints provided by the flow splitter 28, 29 and the Coanda side wall 30 or 31. In so expanding, the spinning liquid breaks up into ligaments which in turn break up into droplets. As seen in FIG. 4, substantially no liquid flows into the space between the two fan-shaped patterns. Therefore, all of the liquid is delivered to those areas of the windshield where it is needed.

If the pressure of the applied wash liquid is increased high enough the fan-shaped patterns tend to merge toward one another to form a single fan pattern. For purposes of windshield washer applications (and other applications where two distinct patterns are desired), the pressure of the applied liquid is kept low enough to prevent merging of the two patterns.

If the pressure of the applied liquid is too low, or if the temperature of the liquid is too low, no vortices are shed by island 27. As described in my aforementioned U.S. Pat. No. 4,151,955, this island-type oscillator has very low pressure threshold requirements for achieving oscillation, on the order of a few tenths of a p.s.i., depending on the oscillator size. Nevertheless, should non-oscillating conditions occur, it is noted that two non-swept jets issue from device 10. These non-swept jets are directed by the Coanda effect along wall portions 30, 31 so that the jets diverge. For windshield washer applications, therefore, these non-swept jets are directed toward the driver and passenger portions of the windshield rather than to the middle of the windshield where the liquid is not needed.

It will be appreciated that the island 27 need not be centered between sidewalls 23, 24; nor must it be symmetrically constructed; nor must it have the shape described. Variations in any of these parameters can be used to configure the spray patterns issued from the device. Likewise, the symmetry of wall portions 30, 31 is not a requirement; nor is the symmetrical placement of inlet opening 26; nor the symmetrical relationship between outlet openings 34, 35.

Typical, but not limiting dimensions for the oscillator of FIGS. 2, 3 as used for windshield washer applications would be as follows: width of island 27: 0.075 inch; length of island 27: 0.054 inch; spacing between upstream surface of island 27 and downstream end of device 10: 0.372 inch; width of chamber 20 between parallel sidewall portions 23, 24: 0.168 inch; width of flow splitter 28, 29: 0.050 inch; length of flow splitter 28, 29: 0.017 inch; width of steps 32, 33: 0.008 inch; curved wall portions 30, 31 are formed on a 0.100 inch radius: depth of chamber 20 between top and bottom walls 21, 22: 0.024 inch.

Advantageously, spray device 10 can be injection molded as a single piece of plastic material in the manner described in my aforementioned U.S. Pat. No. 4,151,955. In addition, if one-piece manufacture is not required, many of the island-type oscillator configurations illustrated in that patent may be employed with a flow divider in accordance to the present invention.

While I have described and illustrated one specific embodiment of my invention, it will be clear that variations of the details of construction which are specifically illustrated and described may be resorted to without departing from the true spirit and scope of the invention as defined in the appended claims.

I claim:

1. A device for receiving pressurized fluid and dispersing that fluid simultaneously in two distinct cyclical flow patterns, said device comprising:
   a housing member;
   a chamber defined in said housing member, said chamber having a top wall, a bottom wall, an upstream end, an open downstream end, and two opposed sidewalls extending between said upstream and downstream ends;
   inlet means opening into said chamber, said inlet means being adapted to admit pressurized fluid into said chamber;
   vortex-shedding means in said chamber comprising an obstruction body having surface means disposed in a flow path between said inlet means and said open downstream end to create downstream of the surface means a cavitation region around which vortices of clockwise and counterclockwise flow directions are alternately shed by said surface means and travel along with the pressurized fluid; and
   flow splitter means disposed in said cavitation region to define two distinct outlet openings with respective sidewalls at the open downstream end of said chamber from which said clockwise and counterclockwise flowing vortices alternately issue to an ambient environment.

2. The device according to claim 1 wherein said two opposed sidewalls diverge from one another at said downstream end of said chamber to provide boundary layer attachment surfaces for guiding outflow through said outlet openings.

3. The device according to claim 1 wherein said obstruction body is spaced from each of said opposed sidewalls, and wherein said opposed sidewalls are parallel to one another proximate said body and curve divergently from a location downstream thereof.

4. The device according to claim 3 wherein said opposed sidewalls include a transversely-extending step at said location from which said sidewalls curve divergently in a downstream direction and extend parallel in an upstream direction.

5. The device according to claim 1 wherein said device is formed as a single piece of molded plastic.

6. The device according to claims 1 or 5 wherein said flow splitter means comprises:
   a first projection from said top wall extending into said chamber; and
   a second projection from said bottom wall extending into said chamber and abutting said first projection.

7. The device according to claims 1, 2, 3, 4 or 5 and located on a motor vehicle forward of a vehicle windshield having a driver side and a passenger side, said device being oriented to issue one of said cyclical flow patterns onto the driver side of the windshield and to issue the other of said cyclical flow patterns into the passenger side of the windshield.

8. A windshield washer device for spraying wash liquid onto a vehicle windshield comprising:
   a body member made of a single piece of molded plastic material;
   a chamber defined in said body member, said chamber having inlet and outlet openings;
   means for supplying pressurized liquid to said inlet opening;
   further means in said chamber and forming part of said body member for forming two cyclical liquid flow patterns;
   outlet means positioned to issue said two flow patterns from said chamber toward said windshield such that said flow patterns break up into liquid droplets before impinging upon said windshield.

9. The device according to claim 8 wherein said outlet means includes means for directing said two flow patterns towards two respective spaced areas of said windshield.

10. The device according to claims 8 or 9:
   wherein said chamber is defined between a top wall, a bottom wall, an open upstream end, a downstream end, and two side walls extending between said upstream and downstream ends;
   wherein said means for supplying comprises an inlet opening defined through at least one of said top, bottom or side walls or said upstream end;
   wherein said further means includes
   an island member located in said chamber, extending between said top and bottom walls and spaced from said sidewalls, said island member being positioned such that liquid flow from said inlet opening to said outlet means must pass around both sides of said island member, said island member including surface means for alternately shedding vortices on opposite sides of said chamber immediately downstream of said surface means; and a flow splitter disposed downstream of said island member for dividing said outlet means into two distinct outlet openings.

11. A windshield washer nozzle for spraying wash liquid onto a vehicle windshield comprising:
   a chamber having an inlet and an outlet;
   means for supplying liquid under pressure to said inlet;
   means positioned in said chamber to be impinged upon by liquid flowing between said inlet and outlet, for alternately establishing clockwise-flowing and counterclockwise-flowing vortices in the flowing liquid; and
   outlet means, dividing said outlet into at least first and second distinct openings, for issuing said clockwise-flowing and counterclockwise flowing vortices through said first and second distinct openings toward respective distinct areas on said windshield.

12. The nozzle according to claim 11 wherein said outlet means includes means for alternately issuing said clockwise-flowing vortices from said first distinct opening and said counterclockwise flowing vortices from said second distinct opening along distinct flow paths.

13. The method of providing a dual pattern liquid spray comprising the steps of:
   establishing a series of vortices in a stream of liquid, flowing in a chamber, said vortices alternately having clockwise and counterclockwise flow directions; and
   issuing the clockwise and counterclockwise flowing vortices alternately from respective openings in said chamber.

14. A windshield washer device for spraying wash liquid onto a windshield comprising:
   means for issuing along a first flow path a stream of fluid oscillating transversely of said first flow path and issuing along a second flow path lying at an angle to said first flow path a stream of fluid oscillating transversely of said second flow path, said means for issuing including:
   a housing member;
   a chamber defined in said housing member, said chamber having a top wall, a bottom wall, an upstream end, an open downstream end, and two opposed sidewalls extending between said upstream and downstream ends;
   inlet means opening into said chamber, said inlet means being adapted to admit pressurized fluid into said chamber;
   vortex-shedding means in said chamber comprising an obstruction body having surface means disposed in a flow path between said inlet means and said open downstream end to create downstream of the surface means a cavitation region around which vortices of clockwise and counterclockwise flow directions are alternately shed by said surface means and travel along with the pressurized fluid;
   flow splitter means disposed in said cavitation region to define two distinct outlet openings with respective sidewalls at the open downstream end of said chamber from which said clockwise and counterclockwise flowing vortices alternately issue to an ambient environment; and
   said flow splitter means lying between said first flow path and said second flow path whereby each of said streams of fluid issue from a different one of said outlet openings.

15. The method of providing a dual oscillating liquid spray comprising the steps of:
   establishing a series of vortices in a confined stream of liquid flowing in a chamber, said vortices having alternating clockwise and counterclockwise flow directions;
   causing all of the clockwise vortices to flow along an unconfined path diverging from the flow path of the stream through the chamber and
   causing all of the counterclockwise vortices to flow along an unconfined path diverging from the flow path of the stream through the chamber to an extent different from the extent of divergence followed by the clockwise vortices.

* * * * *